United States Patent
Bengtsson et al.

(10) Patent No.: US 11,924,142 B2
(45) Date of Patent: Mar. 5, 2024

(54) COVERAGE ENHANCEMENT

(71) Applicant: Sony Group Corporation, Tokyo (JP)

(72) Inventors: Erik Bengtsson, Eslöv (SE); Olof Zander, Södra Sandby (SE); Fredrik Rusek, Eslöv (SE); Kun Zhao, Malmö (SE); Jose Flordelis, Lund (SE)

(73) Assignee: SONY GOUP CORPORATION, Tokyo (JP)

( * ) Notice: Subject to any disclaimer, the term of this patent is extended or adjusted under 35 U.S.C. 154(b) by 0 days.

(21) Appl. No.: 17/921,747

(22) PCT Filed: Mar. 31, 2021

(86) PCT No.: PCT/EP2021/058415
§ 371 (c)(1),
(2) Date: Oct. 27, 2022

(87) PCT Pub. No.: WO2021/228467
PCT Pub. Date: Nov. 18, 2021

(65) Prior Publication Data
US 2023/0163932 A1 May 25, 2023

(30) Foreign Application Priority Data
May 14, 2020 (SE) .................................. 2030159-4

(51) Int. Cl.
*H04W 72/0446* (2023.01)
*H04L 5/00* (2006.01)
(Continued)

(52) U.S. Cl.
CPC .......... *H04L 5/0094* (2013.01); *H04L 5/0005* (2013.01); *H04L 25/0202* (2013.01); *H04L 27/261* (2013.01)

(58) Field of Classification Search
CPC . H04L 5/0094; H04L 5/0005; H04L 25/0202; H04L 27/261; H04L 5/0051;
(Continued)

(56) References Cited

U.S. PATENT DOCUMENTS

2010/0323630 A1* 12/2010 Yokoyama ........... H04B 7/0408
455/67.11
2014/0098761 A1* 4/2014 Lee ....................... H04W 72/20
370/329
(Continued)

FOREIGN PATENT DOCUMENTS

EP 3439218 A1 2/2019
EP 3605977 A1 2/2020
(Continued)

OTHER PUBLICATIONS

International Search Report and Written Opinion from corresponding International Application No. PCT/EP2021/058415, dated Jun. 15, 2021, 11 pages.
(Continued)

*Primary Examiner* — Atique Ahmed
(74) *Attorney, Agent, or Firm* — Tucker Ellis LLP

(57) ABSTRACT

A method of operating a wireless communication device (101) includes receiving (3002) at least one downlink control message (411, 412, 4002) from a communications network (100), the at least one downlink control message (411, 412, 4002) being indicative of a frequency density (401-404) of uplink reference signals (31), the uplink reference signals (31) being for an estimation of a radio channel (114) between the wireless communication device (101) and the communications network (100) to coherently decode data signals encoding data of a uplink data transmission (4012), the uplink reference signals (31) and the data signals using the same precoding. The method also includes transmitting (3003) the uplink reference signals (31) on the radio channel (114) using a time-frequency resource mapping (390) set in accordance with the frequency density (401-404), the time-frequency resource mapping (390) allocating time-frequency resource elements (311, 312, 313) of a plurality of time-frequency resource elements (309, 311, 312, 313) of a time-frequency resource grid (300) of the radio channel (114) to the uplink reference signals (31).

19 Claims, 11 Drawing Sheets

(51) Int. Cl.
*H04L 25/02* (2006.01)
*H04L 27/26* (2006.01)
*H04W 72/1268* (2023.01)

(58) Field of Classification Search
CPC . H04L 5/0053; H04L 5/0096; H04L 25/0226; H04W 72/1268; H04W 72/23; H04W 72/0446
See application file for complete search history.

(56) References Cited

U.S. PATENT DOCUMENTS

| | | | | |
|---|---|---|---|---|
| 2016/0165640 A1* | 6/2016 | Yang | ................ | H04W 72/12 370/336 |
| 2016/0211960 A1* | 7/2016 | Wang | ................ | H04L 5/0051 |
| 2017/0078830 A1* | 3/2017 | Wu | ................ | H04W 72/51 |
| 2017/0150480 A1* | 5/2017 | Kim | ................ | H04L 67/12 |
| 2017/0346607 A1* | 11/2017 | Chen | ................ | H04L 1/189 |
| 2019/0166615 A1 | 5/2019 | Nimbalker | | |
| 2019/0215781 A1* | 7/2019 | Jeon | ................ | H04W 52/325 |
| 2019/0349240 A1 | 11/2019 | Saito | | |
| 2020/0220590 A1* | 7/2020 | Sun | ................ | H04L 25/0391 |
| 2020/0275523 A1* | 8/2020 | Zhang | ................ | H04W 80/08 |
| 2021/0185706 A1* | 6/2021 | Park | ................ | H04J 13/004 |
| 2021/0274568 A1* | 9/2021 | Sengupta | ................ | H04L 5/0051 |
| 2021/0344527 A1* | 11/2021 | Go | ................ | H04W 72/1268 |

FOREIGN PATENT DOCUMENTS

| | | |
|---|---|---|
| WO | 2018064313 A1 | 4/2018 |
| WO | 2018171792 A1 | 9/2018 |
| WO | 2019051324 A1 | 3/2019 |

OTHER PUBLICATIONS

Office Action and Search Report from corresponding Swedish Application No. 2030159-4, dated Mar. 11, 2021, 8 pages.

* cited by examiner

Fig. 2
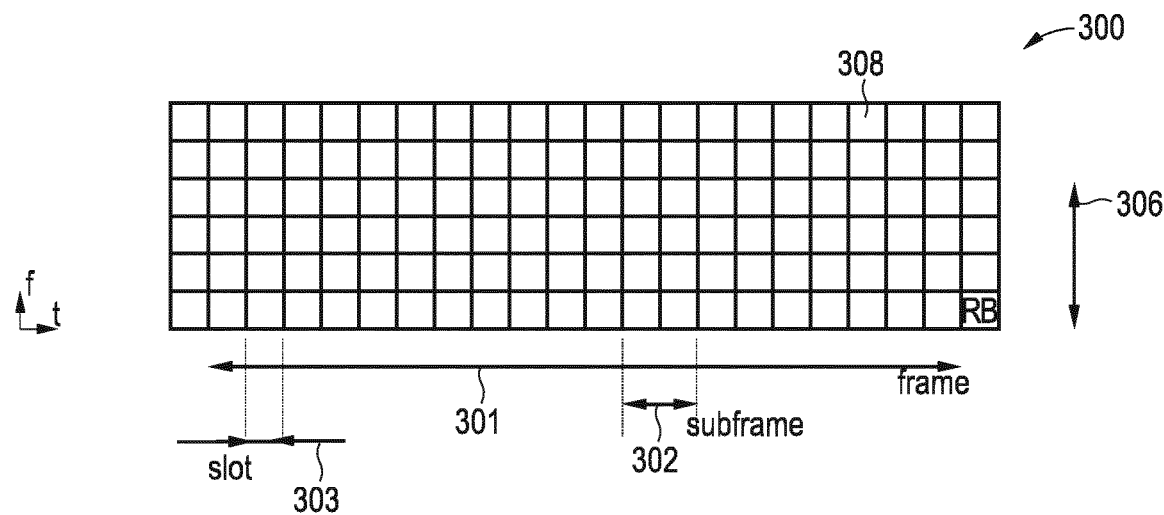
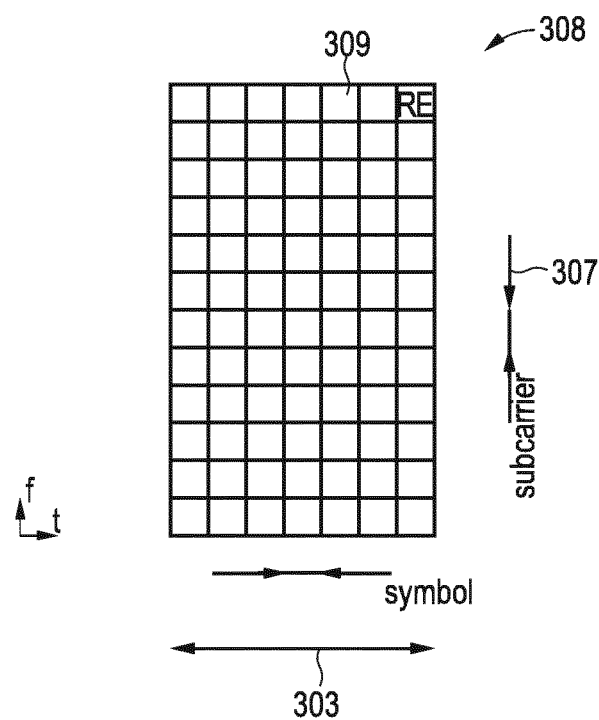

Fig. 11
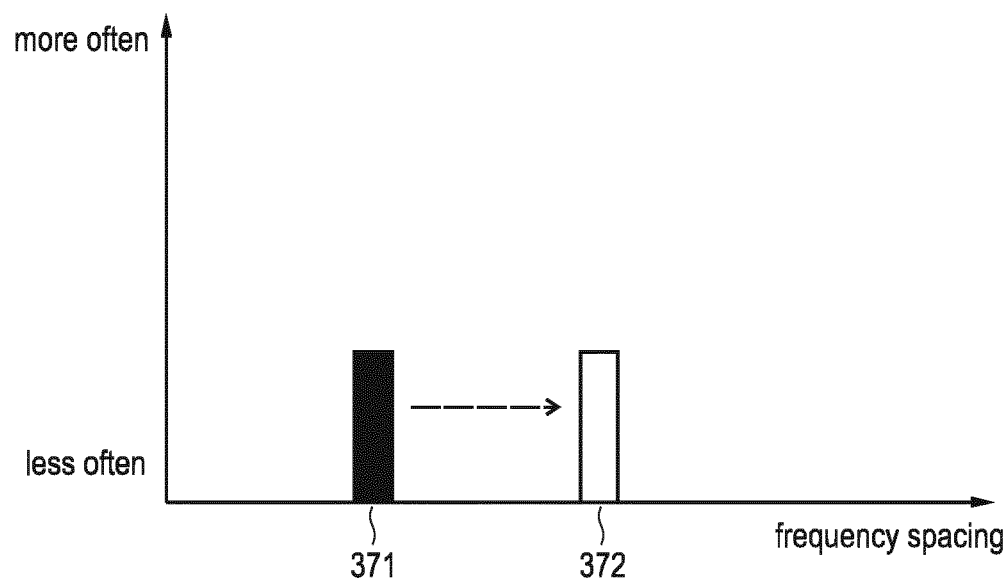
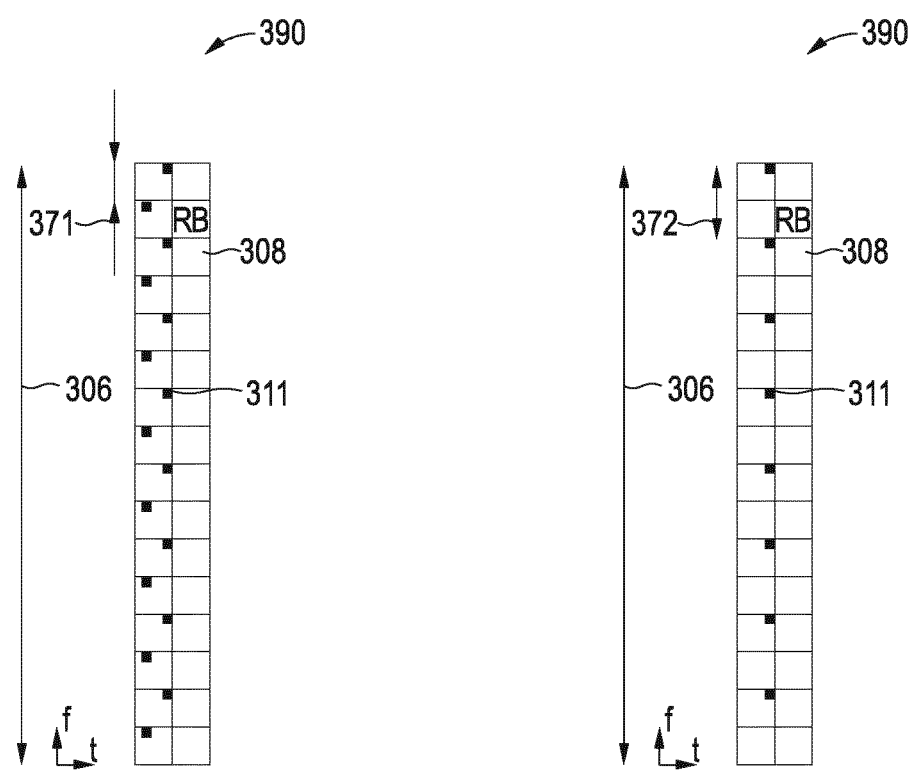

Fig. 12
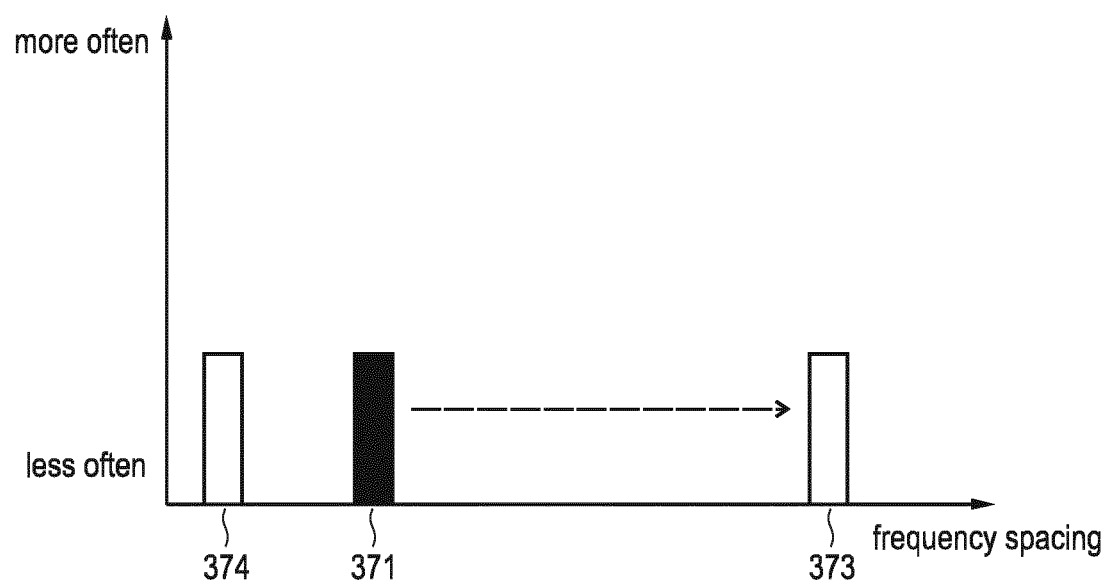
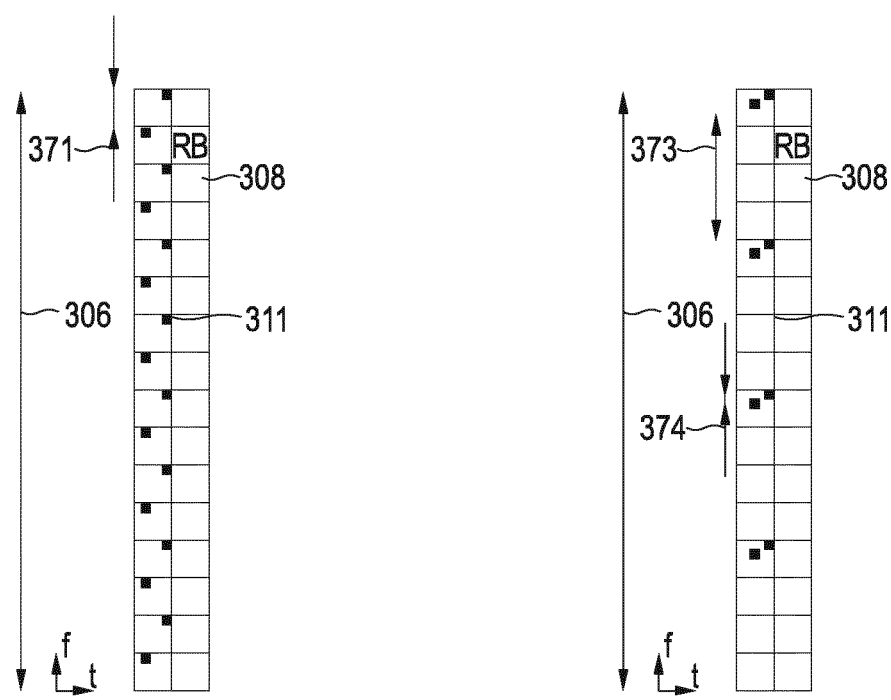

COVERAGE ENHANCEMENT

TECHNICAL FIELD

Various examples generally relate to enhancing coverage of a wireless communication system. Various examples specifically relate to setting a time-frequency resource mapping of resource elements allocated to reference signals used for channel estimation.

BACKGROUND

Wireless communication is widespread. A communications network can connect to multiple wireless communication devices (UEs), thereby forming a communication system. Coverage is an important aspect to consider when designing a communication system. This helps to guarantee quality of service even for UEs faraway from access points of the communications network.

Measures are taken to facilitate coverage enhancement (CE).

For example, in the Third Generation Partnership Project (3GPP), there is a study item, named FS_NR_CovEnh, for 3GPP Release 17. The objective of this study item is to "study potential coverage enhancement solutions for specific scenarios for both FR1 and FR2."

SUMMARY

Accordingly, there is a need for advanced techniques to increase coverage for communication systems.

This need is met by the features of the independent claims. The features of the dependent claims define embodiments.

A method of operating a wireless communication device is provided. The method includes receiving at least one downlink control message from a communications network, the at least one downlink control message being indicative of a frequency density of uplink reference signals. The uplink reference signals are for an estimation of a radio channel between the wireless communication device and the communications network. By means of the estimation of the radio channel, it is possible to coherently decode data signals encoding data of a uplink data transmission. The uplink reference signals and the data signals use the same precoding. The method also includes transmitting the uplink reference signals on the radio channel using a time-frequency resource mapping. The time-frequency resource mapping is set in accordance with the frequency density. The time-frequency resource mapping allocates time-frequency resource elements of a plurality of time-frequency resource elements of a time-frequency resource grid of the radio channel to the uplink reference signals.

For example, prior to transmitting the uplink reference signals using the time-frequency resource mapping, the uplink reference signals may be transmitted using a further time-frequency resource mapping.

It would be possible that the frequency density associated with the time-frequency resource mapping is reduced if compared to a further frequency density associated with the further time-frequency resource mapping. Thereby, the adjustment of the frequency density can be achieved.

It would be possible that an average frequency density is adjusted.

It would be possible that—when reducing the frequency density—the minimum frequency spacing between nearest-neighbor resource elements allocated to the reference signals is increased.

It would be possible that—when adjusting the frequency density—a type of the reference signals—e.g., characterized by the count of antenna ports used for said transmitting—remains fixed.

It would be possible that—when adjusting the frequency density—a pattern of the time-frequency resource mapping remains fixed.

It would be possible that multiple adjustment of the frequency density are executed. It would be possible that multiple adjustment of the frequency density are executed per radio frame, e.g., the frequency density can be adjusted multiple times within 10 ms. It would be possible that the frequency density is adjusted at least twice within 50 ms or within 100 ms.

A computer program or a computer-program product or a computer-readable storage medium includes program code. The program code can be loaded and executed by a control circuitry. Upon loading and executing, the at least one processor performs a method of operating a wireless communication device. The method includes receiving at least one downlink control message from a communications network, the at least one downlink control message being indicative of a frequency density of uplink reference signals. The uplink reference signals are for an estimation of a radio channel between the wireless communication device and the communications network. By means of the estimation of the radio channel, it is possible to coherently decode data signals encoding data of a uplink data transmission. The uplink reference signals and the data signals use the same precoding. The method also includes transmitting the uplink reference signals on the radio channel using a time-frequency resource mapping. The time-frequency resource mapping is set in accordance with the frequency density. The time-frequency resource mapping allocates time-frequency resource elements of a plurality of time-frequency resource elements of a time-frequency resource grid of the radio channel to the uplink reference signals.

A wireless communication device includes a control circuitry configured to receive at least one downlink control message from a communications network. The at least one downlink control message is indicative of a frequency density of uplink reference signals. The uplink reference signals are for an estimation of a radio channel between the wireless communication device and the communications network to coherently decode data signals encoding data of a uplink data transmission. The uplink reference signals and the data signals use the same precoding. The control circuitry is further configured to transmit the uplink reference signals on the radio channel using a time-frequency resource mapping set in accordance with the frequency density. The time-frequency resource mapping allocates time-frequency resource elements of a plurality of time-frequency resource elements of a time-frequency resource grid of the radio channel to the uplink reference signals.

A method of operating an access node of a communications network is provided. The method includes transmitting at least one downlink control message to a wireless communication device, the at least one downlink control message being indicative of a frequency density of uplink reference signals. The uplink reference signals are for an estimation of a radio channel between the wireless communication device and the communications network to coherently decode data signals encoding data of uplink data transmission. The uplink reference signals and the data signals use the same precoding. The method further includes receiving the uplink reference signals on the radio channel using a time-frequency resource mapping set in accordance with the frequency density, the time-frequency resource mapping allocating time-frequency resource elements of a plurality of time-frequency resource elements of a time-frequency resource grid of the radio channel to the uplink reference signals.

A computer program or a computer-program product or a computer-readable storage medium includes program code. The program code can be loaded and executed by a control circuitry. Upon loading and executing, the at least one processor performs a method of operating an access node of a communications network. The method includes transmitting at least one downlink control message to a wireless communication device, the at least one downlink control message being indicative of a frequency density of uplink reference signals. The uplink reference signals are for an estimation of a radio channel between the wireless communication device and the communications network to coherently decode data signals encoding data of uplink data transmission. The uplink reference signals and the data signals use the same precoding. The method further includes receiving the uplink reference signals on the radio channel using a time-frequency resource mapping set in accordance with the frequency density, the time-frequency resource mapping allocating time-frequency resource elements of a plurality of time-frequency resource elements of a time-frequency resource grid of the radio channel to the uplink reference signals.

An access node of a communications network is provided. The access node includes a control circuitry. The control circuitry is configured to transmit at least one downlink control message to a wireless communication device, the at least one downlink control message being indicative of a frequency density of uplink reference signals. The uplink reference signals are for an estimation of a radio channel between the wireless communication device and the communications network to coherently decode data signals encoding data of uplink data transmission. The uplink reference signals and the data signals use the same precoding. The control circuitry is further configured to receive the uplink reference signals on the radio channel using a time-frequency resource mapping set in accordance with the frequency density, the time-frequency resource mapping allocating time-frequency resource elements of a plurality of time-frequency resource elements of a time-frequency resource grid of the radio channel to the uplink reference signals.

A method of operating a wireless communication device in a coverage enhancement mode of a data transmission comprising data is provided. The method comprises transmitting a redundancy version of the data using a code rate that is below 1/100, wherein a length of the redundancy version is longer than one or more slots, e.g., at least longer than 10 slots.

A method of operating a wireless communication device in a coverage enhancement mode of a data transmission comprising data is provided. The method comprises transmitting multiple repetitions of a given redundancy version contemporaneously in time and offset in frequency domain.

It is to be understood that the features mentioned above and those yet to be explained below may be used not only in the respective combinations indicated, but also in other combinations or in isolation without departing from the scope of the invention.

BRIEF DESCRIPTION OF THE DRAWINGS

FIG. 2 schematically illustrates a time-frequency resource grid of a radio link between the UE and the cellular network according to various examples.

FIG. 11 schematically illustrates an adjustment of the frequency density of reference signals according to various examples.

FIG. 12 schematically illustrates an adjustment of the frequency density of reference signals according to various examples.

DETAILED DESCRIPTION OF EMBODIMENTS

Figure 1:
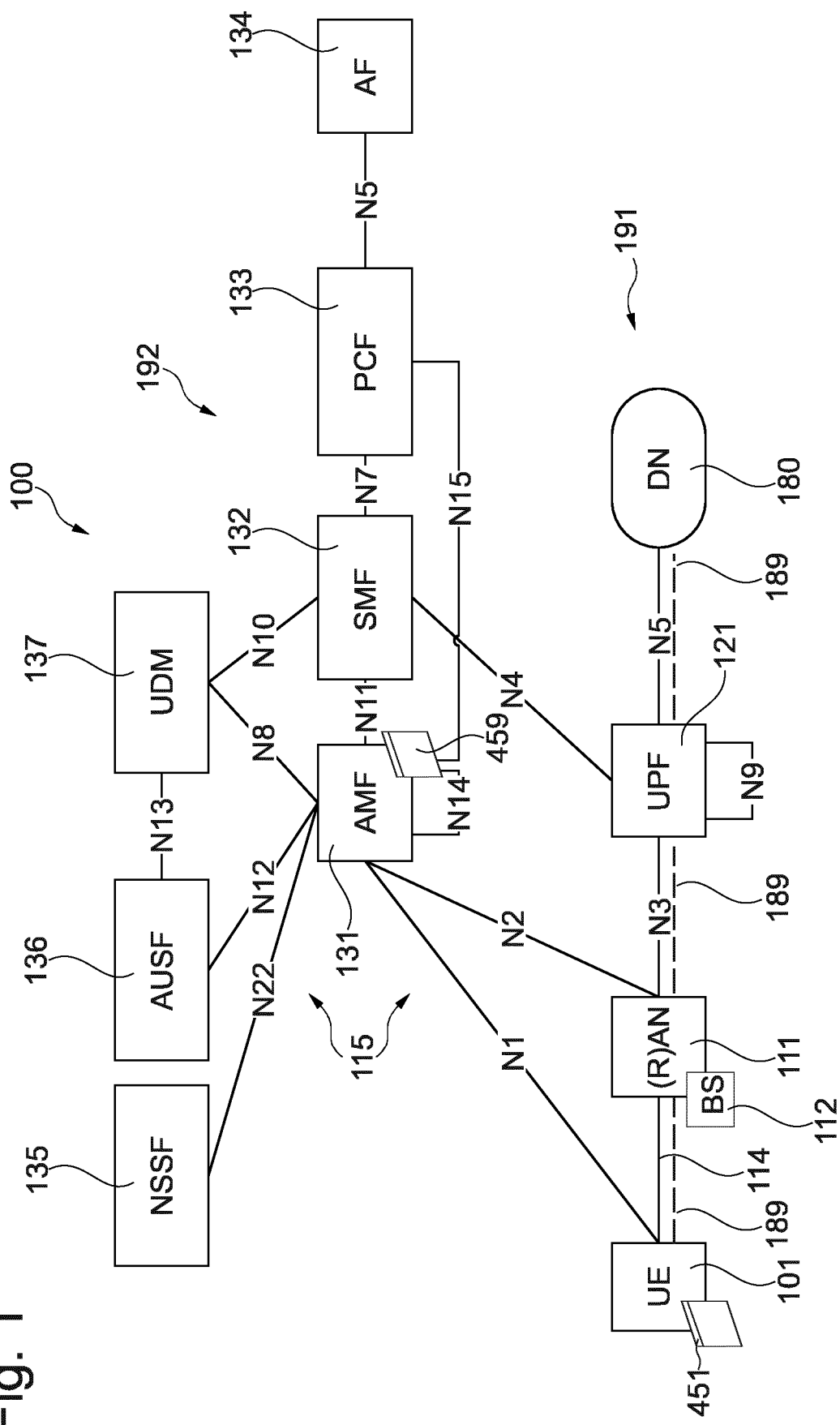
FIG. 1 schematically illustrates a cellular network and a UE forming a communication system according to various examples.

Some examples of the present disclosure generally provide for a plurality of circuits or other electrical devices. All references to the circuits and other electrical devices and the functionality provided by each are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Hereinafter, techniques of wireless communication are described. Respective communication systems can include one or more access nodes of a communications network and one or more UEs connectable to the communications network via the one or more access nodes. A specific implementation of a communications network is a cellular network having multiple cells each being served by one or more access points being implemented as base stations (BSs).

Communication of signals from a UE to the cellular network is referred to as uplink (UL) communication and communication of signals from the cellular network to a UE is referred to as downlink (DL) communication. The techniques described herein can be applicable to UL communication, as well as DL communication.

A message communicated in the uplink can be referred to as uplink message and a message communicated in the downlink can be referred to as downlink message.

For illustrative purposes, various examples are described in the context of UL communication in a 3GPP New Radio (NR) communication system operating in frequency range 2 (FR2). However, similar techniques can be applied to other kinds and types of communication systems and/or to DL communication or even peer-to-peer communication, sometimes labeled sidelink in the context of a cellular network.

Various techniques are described herein which enhance the coverage of a data transmission in a communication system. This means that for a given data rate, the distance at which transmissions can be received reliably is increased. Conversely, it can also mean that for a given distance, the maximum data rate at which transmissions can be reliably received is increased.

Some of the techniques to enhance coverage are summarized in TAB. 1 below:

TABLE 1

Options for enhancing coverage. The techniques A, B, and C all involve a transmission of RSs. The techniques D and E relate to CE protection of a data of a data transmission by appropriately setting CE parameters.

| Technique | Brief description | Example details |
|---|---|---|
| A | Configuring a transmission of reference signals (RSs) by setting a time-frequency resource mapping of resources allocated to the RSs | The transmission of RSs can be configured by setting one or more properties of a time-frequency resource mapping of the resources allocated to the RSs. For example, adjustment of a frequency density and/or a time density of the resources would be possible. For example, the frequency density may be adjusted by adjusting a count of RSs per frequency unit and per time unit. For example, the frequency density may be adjusted by adjusting a frequency spacing between adjacent RSs. The frequency density may be adjusted while the timing of resource elements allocated to the RSs is kept constant; likewise, the time density may be adjusted while the frequencies of resource elements allocated to the RSs is kept constant. |
| | | By configuring the transmission of the RSs, it is possible to free-up additional resources for protective measures to obtain the CE for the data transmission. Example protective measures include transmitting error protection bits of a forward error correct, transmitting additional repetitions of data, etc.. Likewise, transmit power from the freed-up RSs can be reallocated to the data transmission, to obtain further CE. |
| B | Configuring a transmission of RSs by temporarily suspending transmitting of the RSs | This can be seen as an extreme case of technique A, in which the frequency density and time density is reduced to 0. This can be referred to as RS-less operation. For instance, the RSs may be suspended upon activating a CE transmission mode for the data transmission.
In this case, the receiver needs to decode the received data signals blindly, i.e., in the absence of channel estimates.
The transmission of RSs can be suspended until further notice or for a predetermined amount of time, e.g., measured in multiples of subframes or frames. The transmission of RSs can be suspended until detection of a predetermined trigger event. |
| C | Configuring a transmission of RS by defining a polarization of RSs | By using polarized RSs, the polarization of the radio channel can be estimated and, thus, the communication quality can be increased. This leads to CE.
The transmitter can increase the amount of power reaching the receiver by aligning its transmissions with the direction of polarization of the radio channel at the transmit end of the communication link. Similarly, the receiver should also align reception to the direction of polarization of the channel at the receive link-end. For this to be possible, UL RSs can be transmitted using two linearly independent polarizations in distinct resources, i.e., a 0°-polarized RS and a 90°-polarized RS (0° and 90° are relatively defined). Compared to RS transmissions using a single polarization, the proposed technique requires double as many resources.
This may be implemented in one of the following ways: (i) By using a feedback signaling indicating an observed polarization of the transmitted RS. In an example, the UE transmits two RSs of different polarization to the BS, the BS estimates a polarization of the received RS, the BS then signals the estimated optimal polarization direction to UE, and the UE aligns subsequent data transmissions according to the polarization feedback by the BS. The UE can continue to transmit the polarized RSs to the BS. (ii) By sending RSs in the reverse direction, i.e., DL. These DL RS can be used by the UE to estimate a suitable polarization for UL data transmissions and associated UL RS transmissions. In this case, no feedback channel is required. |
| D | Ultra-low code rate | The code rate of a forward error correction code is the proportion of the data-stream that is useful (non-redundant). The code rate thus is associated with the ratio of the data rate that is allocated for a time instance and the maximum data rate that ideally can be allocated in the same time instance. A lower code rate means that more redundancy bits |

TABLE 1-continued

Options for enhancing coverage. The techniques A, B, and C all involve a transmission of RSs. The techniques D and E relate to CE protection of a data of a data transmission by appropriately setting CE parameters.

| Technique | Brief description | Example details |
|---|---|---|
| | | are inserted during the channel coding process and a higher code rate means that less redundancy bits are inserted. A code rate of less than, e.g., 1/100 can be applied. Lower code rates tend to lead to CE. To achieve such low code rates, transmissions may span several slots in time. In extremely poor coverage conditions, UEs may request, and the BS may schedule a single repetition of a given redundancy version of the data of the data transmission to extend over several slots with the purpose of overcoming temporary or permanent unusually large pathlosses. I.e., as a general rule, the length of the given redundancy version (e.g., the lowest redundancy version) can be longer than one or two slots. Repetitions of the given redundancy version may not be required. The net result is an encoding with ultra-low code rates. Ultra-low code rates can also be used in conjunction with blind decoding (see technique B above). |
| E | Repetitions of redundancy versions of data of the data transmission | The same redundancy version of data can be transmitted multiple times. Associated RSs can be transmitted in all, some or none of the repetitions. In poor coverage conditions communication is typically limited by the amount of available power while, at the same time, there might be an excess of REs available for communication. Under such conditions, communication reliability can be improved by including additional redundancy in all the available resources, by repetitions of the same redundancy version of the data. Different redundancy versions can be offset in frequency domain, e.g., of the same slot or subframe (i.e., concurrent transmission of a packet in the frequency domain). This could be beneficial, e.g., for communication with users at the cell edge when a large bandwidth is available which cannot be used completely because no coding schemes are available with sufficiently low code rates. |

The techniques to increase coverage disclosed herein, in particular according to TAB. 1, can be applied jointly or independently. The techniques disclosed herein apply to data transmissions of payload data and/or of control data (e.g., Layer 3 RRC control data), to transmissions in the UL directions and/or in the DL direction. Likewise, they can be applied to various frequency ranges of interest.

It has been found that UL communication in FR2 has the potential to benefit significantly from the techniques described herein, in terms of increased coverage. There are two reasons for this. First, it follows from the well-known Friis transmission equation in free space that the pathloss increases with the square of the carrier frequency. Thus, for a given transmit power constraint, the area covered by a wireless communication system shrinks as the frequency of operations increases. Second, UEs are typically battery-powered and therefore coverage is more limited for UL communication compared to DL communication (the BS is connected to the energy grid). The reader will appreciate, however, that the method herein disclosed can also be applied to DL communication, as well as to sidelink or device-to-device communications. Moreover, the method disclosed is not limited to FR2 but can also be applied to bands in other frequency ranges, such as frequency range 1 (FR1).

Various techniques described herein rely on channel estimation of the radio channel between the cellular network and the UE. The channel estimation can facilitate coherent decoding of data signals at a receiver, e.g., for an Orthogonal Frequency Division Multiple (OFDM) modulation. Such RSs are, thus, also referred to as demodulation RSs (DM-RS).

RSs (sometimes also referred to as pilot signals) are transmitted on the radio channel, e.g., in the UL.

As a general rule, RSs have a well-defined transmit shape and, thus, it is possible to estimate the impact of the radio channel on the observed receive shape by using the transmit shape as a baseline. One or more receive properties—e.g., amplitude and phase—may be determined for this purpose at the receiver.

The RSs may, in some examples, be precoded. I.e., a spatial filter filter may be applied to the respective waveforms, using amplitude and phase relationships between different antenna elements. RSs are to be distinguished from signals encoding data (data signals)—e.g., control data and/or payload data; because the data is a-priori unknown to the receiver, also the transmit shape is not well-defined or known to the receiver. The RSs can be specific to a UE, i.e., uniquely associated with a UE. This can be due to beamforming and can be different to non-precoded RSs, e.g., channel reference signal (CRS) used in 3GPP 4G.

As a general rule, the RSs can be associated with a payload transmission including payload data: The RSs can facilitate estimating the channel to then perform coherent decoding of the data signals encoding the data of the data transmission based on the channel estimate, to recover the data. For this purpose, a time-frequency resource mapping of the RSs to a resource grid of the radio channel including a grid of time-frequency resource elements (REs) can allocate REs to the RSs across the frequency range covered by the data transmission. In particular, it is possible that the REs allocated to the RSs are interspersed with the REs allocated to the data transmission: I.e., it is possible that one set of REs is scheduled by a scheduler (i.e., a scheduling control message may be indicative of the set of REs) and that these REs are then allocated by the UE to the RSs or data signals, by selecting the REs allocated to the RSs from the set and selecting the REs allocated to the data signals from the set. Thus, different REs can be allocated to the RSs than to the data signals.

It would be possible that the time-frequency resources allocated to the RSs are restricted to such frequencies that are actually used for the data transmission. The RSs are pre-coded in the same manner as the data transmission, i.e., using the same spatial filters.

The RSs can be tailored to have a small power variation in the frequency domain to allow for accurate estimation of the radio channel across the entire frequency range spend by the data transmission. For this, a pseudo-random sequence—e.g., a Gold sequence—can be used, wherein the sequence may be generated across all time-frequency resources in the frequency range.

An example of RSs subject to the techniques described herein are 3GPP NR DM-RS, see, e.g., Dahlman, Erik, Stefan Parkvall, and Johan Skold. 5G NR: The next generation wireless access technology. Academic Press, 2018, chapter 9.11.1 DEMODULATION RSS FOR OFDM-BASED DOWNLINK AND UPLINK.

The DM-RS can be associated with Physical Uplink Shared Channel (PUSCH) data transmissions. DM-RSs can also be associated with data transmission on the Physical Uplink Control Channel (PUCCH), or—in the DL—with dated transmissions on the Physical Downlink Shared Channel (PDSCH) or the Physical Downlink Control Channel (PDCCH).

According to various techniques described herein, the time-frequency mapping of the RSs to the time-frequency resource grid of the radio channel can be dynamically changed or adjusted (see TAB. 1, techniques A and B). This may be network-controlled, e.g., using Layer 3 or Layer 2 or Layer 1 control signaling. It could also be initiated by the UE.

As a general rule, various options are available for dynamically changing the time-frequency resource mapping. For example, a time spacing between subsequently transmitted RSs may be adjusted. Alternatively or additionally, a frequency spacing between adjacent RSs—e.g., located in the same transmission slot—can be adjusted. The frequency density of the RSs may be adjusted. A hopping pattern defining a variation in the time position and/or frequency position—e.g., defined with respect to RBs—from RS occasion to RS occasion could be adjusted. By such techniques, it is possible to tailor the time-frequency resource mapping. In particular, the time domain and/or frequency domain density of RSs can be tailored in view of the coverage situation. For instance, it has been found that for a poor-coverage situation (e.g., cell edge), a different time domain and/or frequency domain density of the RSs can be helpful if compared to a good-coverage situation.

In particular, the frequency density of RSs can be adjusted by means of the parameter pilotSeparation, denoted $\Delta_P$, which determines the distance between two REs adjacent in the frequency domain and which are allocated to RSs (i.e., it defines a frequency spacing). For example, a setting $\Delta_P=2$, representative of Rel. 16 NR 5G for PUSCH transmissions, corresponds to ½ of the resource elements (REs) in a symbol being allocated to PUSCH DM-RSs. On the other hand, by setting $\Delta_P=24$, only every 24th RE in a symbol is allocated to PUSCH DM-RSs. Hence, not all resource blocks (RBs; each RB includes multiple REs) allocated to a UE for PUSCH transmissions would carry PUSCH DM-RSs: the frequency-density of the PUSCH DM-RS would be smaller than one per RB. Different RBs can carry a different count of PUSCH DM-RS. Thereby, low frequency densities of the DM-RSs can be achieved, which can be helpful to extend coverage where the freed-up resource elements are used to protect the data transmission, by taking CE measures.

As will be appreciated from the above, by virtue of the proposed adjustment mechanism for the frequency density of the RSs, the density of RSs can be seen belonging to a continuum. RSs can be equally spread out over the covered bandwidth. At one end of the spectrum of available densities, data transmissions of payload or control data without associated RSs, so-called RS-less transmissions, may be used.

This corresponds to $\Delta_P=\infty$ (see TAB. 1, technique B). At the other end of the spectrum, $\Delta_P=1$, and all the REs in the OFDM symbol are allocated for RSs.

As a general rule, it would be possible that one or more other configuration parameters of the RSs transmission are fixed, when adjusting the frequency density. For example, the frequency density can be adjusted while a count of antenna ports used for transmitting the RSs remains fixed. Alternatively or additionally, the frequency density can be adjusted while a pattern of the time-frequency resource mapping of the REs allocated to the RSs remains fixed; i.e., all frequency spacings encountered within the frequency range are equally adjusted, without adding further frequency spacings. By selectively adjusting the frequency density—while keeping one or more other configuration parameters of the RS transmission fixed—it can be possible to avoid a significant reconfiguration of the operation at the UE and/or the BS, which facilitates fast adjustments. Thereby, changes to the channel can be tracked, in particular when—along with adjustments to frequency density—the UE switches from a first setting of a CE parameter to a second setting of the CE parameter.

For illustration, it would be possible that—along with commencing said transmitting of the RSs in accordance with the time-frequency resource mapping that is set in accordance with the adjusted frequency density —, the UE switches from a first setting of a CE parameter used for the uplink data transmission to a second setting of the CE parameter used for the uplink data transmission. This means that the setting of the CE parameter for the data transmission can be correlated with the adjustment of the frequency density (or, generally, any re-configuration of the RS transmission). In short, the re-configuration of the RS transmission and occurs for the purpose of CE, i.e., the CE parameter is set in a correlated fashion. For example, the switch between setting of the CE parameter may occur at the same time at which the adjusted frequency density is implemented; or it would be possible to consider a predefined time offset.

A few CE parameters that can be subject to the techniques described herein are summarized in TAB. 2 below.

TABLE 2

CE parameters that can be set, e.g., in a correlated manner with adjusting a frequency density of RSs.

| CE parameter | Details |
| --- | --- |
| Transmit power of data signals | A higher transmit power tends to increase the coverage. At the same time, the maximum usable transmit power may be limited by a transmit power budget per time and frequency, e.g., due to hardware restrictions of the transmitter circuitry. Thus, an aggregate transmit power may be limited to some threshold. Thus, where the frequency density of the RSs is reduced, the transmit power budget may be redistributed to the data signals, from what was previously used for transmitting the RSs.<br>In detail: in poor coverage conditions, wireless communications are typically limited by the available power for transmissions (see TAB. 2, "Transmit power of data signals"). This means that data rates can only be effectively increased if more power is made available to the transmitter and/or receiver. Here, hardware restrictions of the wireless interface of the UE can impose a transmit power budget. Because of this, UEs at the cell edge will typically use waveforms with lower peak-to-average ratio (PAPR), such DFT-spread OFDM, for UL data transmissions, such as PUSCH transmissions. Likewise, UL data transmission of control data, such as PUCCH transmissions, will typically resort to sequences with low PAPR, such as Zadoff-Chu sequences. To provide additional transmit power to the data transmission, it is possible to reduce the frequency density of UL RSs. Then, the available transmit power budget can be redistributed to provide higher transmit power for data signals including the data of the data transmission. |

TABLE 2-continued

CE parameters that can be set, e.g., in a correlated manner with adjusting a frequency density of RSs.

| CE parameter | Details |
|---|---|
| Redundancy repetition count of the data | A redundancy version of data—e.g., defined by a certain error correction checksum and code rate—may be repeatedly transmitted so that at the receiver, after combining the respective data signals, a coherent decoding of the combinations of combined data signals is possible. This is different to Automatic Repeat Request retransmissions which are on-demand and triggered after a decoding attempt. Thus, redundancy repetitions may be labeled blind repetitions. Thus, upon reducing the frequency density of the RSs, more resource element become available for carrying redundancy repetitions of the data. Thus the count of repetitions can be increased. As a general rule, redundancy repetitions may be arranged offset in time domain and/or frequency domain. Also see Tab 1, technique E. |
| Code rate of the data of the uplink data transmission | Upon reducing the frequency density of the RSs, more resource elements become available for carrying redundancy bits. Coverage can be enhanced. |

According to the techniques described herein, the parameter pilotSeparation—or another parameter of the configuration of the RSs transmission—is dynamic and can be set by control signaling. For example, the said parameter can be part of a L3 Radio Resource Control (RRC) information element for PUSCH-DM-RS configuration. Alternatively, or additionally, it can also set via L1 (PHY) and/or layer L2 (MAC) control signaling. For example, a DL control message may be indicative of the parameter in explicit or implicit form. For instance, a relative change of the parameter may be signaled, with respect to a current value of the parameter. Thereby, incremental changes can be implemented. It would also be possible that the DL control message includes an indicator indicative of an entry of a codebook that is predefined and includes multiple candidate values for the parameter. In particular, the codebook may include not less than 3 entries, preferably not less than 10 entries, more preferably not less than 100 entries. The codebook can be pre-configured in the UE and the BS, e.g., by negotiations. The codebook is synchronized between both sides, i.e., known to both sides. The codebook could be fixed by standardization.

As a general rule, various triggers are conceivable for adjusting a parameter of the configuration of the RS transmission such as the frequency density. Some of these trigger criteria are summarized in TAB. 3 below.

TABLE 3

Trigger criteria for adjusting a configuration of the RS transmission, e.g., for adjusting the frequency density. A combination of one or more such trigger criteria would be possible. A hierarchy between trigger criteria could be implemented, e.g., using a primary and secondary decision criteria.

| Trigger | Explanation |
|---|---|
| Coherence bandwidth of the radio channel | In general, is suffices to allocate one RE per coherence bandwidth interval to RSs. Note that the coherence bandwidth depends on the characteristics of the multipath propagation. In particular, it depends on the delay spread of the radio channel. Various techniques are based on the finding that, when precoding is used—as is typical for |

TABLE 3-continued

Trigger criteria for adjusting a configuration of the RS transmission, e.g., for adjusting the frequency density. A combination of one or more such trigger criteria would be possible. A hierarchy between trigger criteria could be implemented, e.g., using a primary and secondary decision criteria.

| Trigger | Explanation |
|---|---|
| | higher frequencies exhibiting higher pathloss—, there can be a tendency of reduced multipath propagation. Accordingly, the coherence bandwidth can be large. For instance, the coherence bandwidth of the radio channel drops below a certain value that is predefined, the parameter of the configuration of the RS transmission can be adjusted. It would also be possible that the parameter of the configuration of the RS transmission—e.g., the frequency density—is continuously readjusted based on tracking changes to the coherence bandwidth. |
| Quality of the received signal | The quality of the received signal may be measured, e.g., in terms of the signal-to-noise ratio (SNR) and/or the signal-to-noise-plus-interference ration (SINR). More specifically, in order to improve the quality of the channel estimates, one might need to allocate additional REs for RSs in poor channel propagation conditions, such as when the UE is located far away from the BS, or when the line-of-sight between the UE and the BS is temporarily blocked, e.g., by building or by the user's body. |
| CE parameter | One or more of the CE parameters as described in TAB. 2, such as data rate or code rate, can be used to determine whether an adjustment of the configuration of the RS transmission is required. For example, transmissions at low data rates and/or using low code rates may be more tolerant to the quality of the channel estimates available to the receiver, thereby allowing for a low density of RSs. This is because, in this case, more robust modulation and/or coding schemes are typically used. Conversely, transmissions at high data rates and/or high code rates may call for denser RSs. |

For illustration, it would be possible that the UE determines a current value associate with one or more of such trigger criteria as summarized in TAB. 3 can then transmits an UL control message to the cellular network including an indicator indicative of a requested frequency density of the RSs that is based on this current value. The UE could also transmit the current value. Alternatively or additionally, it would also be possible that a BS determines the current value and transmits the DL control message that is indicative of the frequency density of the RSs to the UE.

FIG. 1 schematically illustrates a cellular NW 100. The example of FIG. 1 illustrates the cellular NW 100 according to the 3GPP 5G architecture. Details of the 3GPP 5G architecture are described in 3GPP TS 23.501, version 15.3.0 (2017-09). While FIG. 1 and further parts of the following description illustrate techniques in the 3GPP 5G framework of a cellular NW, similar techniques may be readily applied to other communication protocols. Examples include 3GPP LTE 4G—e.g., in the MTC or NB-IOT framework—and even non-cellular wireless systems, e.g., an IEEE Wi-Fi technology.

In the scenario of FIG. 1, a UE 101 is connectable to the cellular NW 100. For example, the UE 101 may be one of the following: a cellular phone; a smart phone; an IOT device; a MTC device; a sensor; an actuator; etc. The UE 101 has a respective identity 451, e.g., a subscriber identity.

The UE 101 is connectable to a core NW (CN) 115 of the cellular NW 100 via a RAN 111, typically formed by one or more BSs 112 (only a single BS 112 is illustrated in FIG. 1 for sake of simplicity). A radio channel 114 is present between the RAN 111—specifically between one or more of the BSs 112 of the RAN 111—and the UE 101. The radio channel 114 can be estimated by means of RSs. The BS 112 can transmit DL RSs and the UE 101 can transmit UL RSs.

The radio channel 114 implements a time-frequency resource grid 300, as illustrated in FIG. 2. Typically, Orthogonal Frequency Division Multiplexing (OFDM) is used: here, a carrier includes multiple subcarriers 307. The subcarriers 307 (in frequency domain) and the symbols (in time domain) then define time-frequency REs 309 of the time-frequency resource grid 300. Multiple REs 309 can be grouped in RBs 308. Scheduling of resources for transmission can be implemented on the granularity of RBs 308. I.e., scheduling control messages—e.g., DL control information (DCI) communicated on the PDCCH—can include indicators indicative of one or more RBs. The time-sequence is further structured by means of slots 303, subframes 302 (each subframe includes two slots 303), and frames 301 (each frame includes ten subframes 302).

For example, for 3GPP NR:

TABLE 4

Time units of a time-frequency resource grid 300 in 3GPP NR. It is noted that the concept of a slot is slightly different in 3GPP 4G Long Term Evolution (LTE) and 5G NR. In 5G, the slot is the basic unit and has the same meaning as a 4G subframe. Furthermore, its duration scales with the numerology. By contrast a 5G subframe and frame have fixed durations (1 m and 10 ms), as illustrated above.

| Time Unit | Duration |
| --- | --- |
| Frame 301 | 10 ms |
| Subframe 302 | 1 ms |
| Slot 303 | 0.5 ms |

Different REs 309 or RBs 308 can be allocated to different logical channels of the radio channel 114. Examples include: PUCCH, PUSCH, PDSCH, and/or PUSCH.

Also illustrated in FIG. 2 is a frequency range 306 used for a data transmission. The frequency range 306 is a certain fraction of the overall bandwidth of the radio channel 114, but, as a general rule, it would be possible that the frequency range 306 equals the overall bandwidth.

Referring again to FIG. 1: The CN 115 includes a user plane (UP) 191 and a control plane (CP) 192. Application data is typically routed via the UP 191. For this, there is provided a UP function (UPF) 121. The UPF 121 may implement router functionality. Payload data may pass through one or more UPFs 121. In the scenario of FIG. 1, the UPF 121 acts as a gateway towards a data NW 180, e.g., the Internet or a Local Area NW. Payload data can be communicated between the UE 101 and one or more servers on the data NW 180.

The cellular NW 100 also includes a mobility-control node, here implemented by an Access and Mobility Management Function (AMF) 131 and a Session Management Function (SMF) 132. These entities consume and generate control data.

The cellular NW 100 further includes a Policy Control Function (PCF) 133; an Application Function (AF) 134; a NW Slice Selection Function (NSSF) 134; an Authentication Server Function (AUSF) 136; and a Unified Data Management (UDM) 137. FIG. 1 also illustrates the protocol reference points N1-N22 between these nodes.

The AMF 131 provides one or more of the following functionalities: connection management sometimes also referred to as registration management; NAS termination for communication between the CN 115 and the UE 101; connection management; reachability management; mobility management; connection authentication; and connection authorization.

A data connection 189 for data transmission is established by the SMF 132 if the respective UE 101 operates in the connected mode. The data connection 189 is characterized by UE subscription information hosted by the UDM 137. To keep track of the current mode of the UE 101, the AMF 131 sets the UE 101 to CM-CONNECTED or CM-IDLE. During CM-CONNECTED, a non-access stratum (NAS) connection is maintained between the UE 101 and the AMF 131.

The SMF 132 provides one or more of the following functionalities: session management including session establishment, modify and release, including bearers set up of UP bearers between the RAN 111 and the UPF 121; selection and control of UPFs; configuring of traffic steering; roaming functionality; termination of at least parts of NAS messages; etc. As such, the AMF 131 and the SMF 132 both implement CP mobility management needed to support a moving UE.

The data connection 189 is established between the UE 101 and the RAN 111 and on to the UP 191 of the CN 115 and towards the DN 180. For example, a connection with the Internet or another packet data NW can be established. Payload data of a data transmission can be transmitted along the data connection 189. To establish the data connection 189, i.e., to connect to the cellular NW 100, it is possible that the respective UE 101 performs a random access (RACH) procedure, e.g., in response to reception of a paging signal or in response to UE-originating UL data being buffered for transmission. This establishes at least a RAN-part of the data connection 189. A server of the DN 180 may host a service for which payload data is communicated via the data connection 189. The data connection 189 may include one or more bearers such as a dedicated bearer or a default bearer. The data connection 189 may be defined on the RRC layer, e.g., generally Layer 3 of the OSI model.

Figure 3:
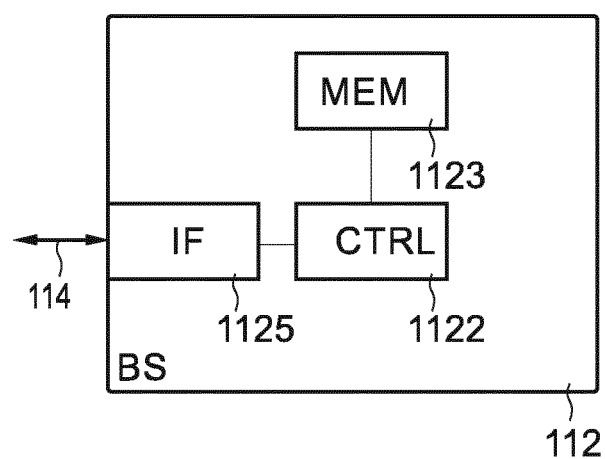
FIG. 3 schematically illustrates a base station of the cellular network according to various examples.

FIG. 3 schematically illustrates the BS 112. The BS 112 includes a control circuitry 1122, e.g., implemented by one or more processors. The control circuitry 1122 can load program code from a memory 1123. The BS 112 can communicate on the radio channel 114 using an interface 1125. The control circuitry 1122, upon executing the loaded program code, can perform techniques as described herein, e.g.: configuring a data transmission to or from the UE 101, e.g., by determining one or more CE parameters; configuring a RS transmission to or from the UE, e.g., by configuring a time-frequency resource mapping of RE allocated to the RSs; transmitting one or more DL control messages to the UE 101, e.g., thereby configuring a RS transmission (TAB 1, techniques A-C); determining a frequency density of RSs; controlling the interface 1125 to decode an UL transmission, e.g., perform blind decoding or a coherent decoding based on a channel estimate determined based on a receive property—e.g., a receive amplitude and/or a receive phase—of a received UL RS; etc.

Figure 4:
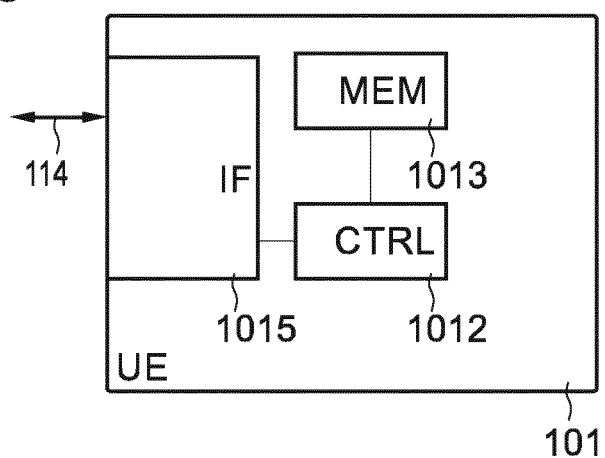
FIG. 4 schematically illustrates the UE according to various examples.

FIG. 4 schematically illustrates the UE 101. The UE 101 includes a control circuitry 1012, e.g., implemented by one or more processors. The control circuitry 1012 can load program code from a memory 1013. The UE 101 can communicate on the radio channel 114 using an interface 1015. The control circuitry 1012, upon executing the loaded program code, can perform techniques as described herein, e.g.: transmitting UL RSs for estimating the radio channel 114; monitoring for DL RSs; transmitting and/or receiving (communicating) RSs in accordance with a time-frequency resource mapping that is set in accordance with a frequency density that may be network-controlled; setting the time-frequency resource mapping in accordance with a DL control message received from the cellular network 100, e.g., in accordance with a respectively indicated frequency spacing between adjacent RSs; suspending transmitting the UL RSs, e.g., in response to detecting a respective trigger criterion associated with the UL data transmission; etc.

Figure 5:
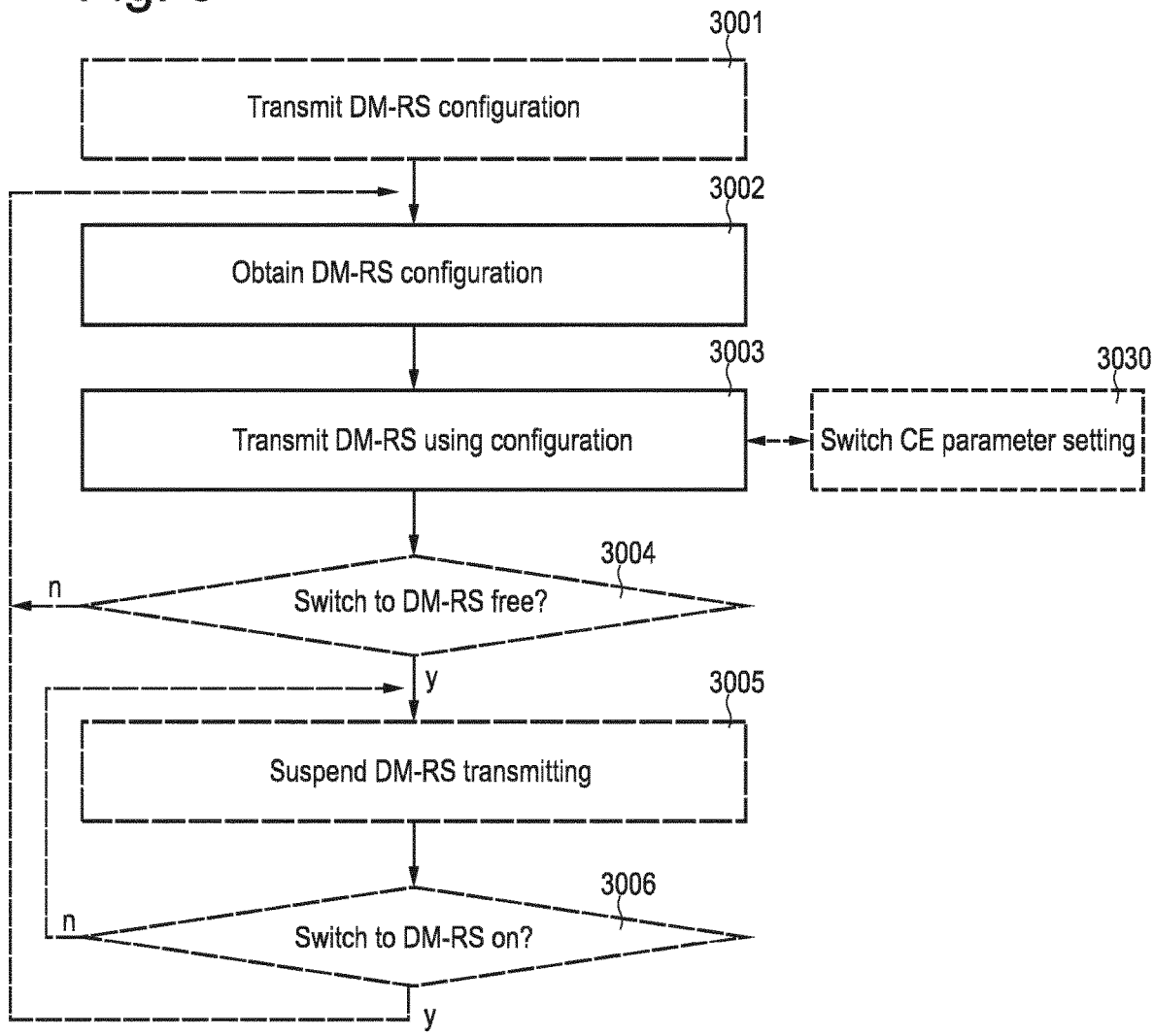
FIG. 5 is a flowchart of a method according to various examples.

FIG. 5 is a flowchart of a method according to various examples. For instance, the method of FIG. 5 may be executed by a UE, e.g., by the control circuitry of the UE upon loading program code from a local memory of the UE. The techniques of FIG. 5 will be explained hereinafter in connection with a scenario in which the method of FIG. 5 is executed by the UE 101.

Optional blocks are labelled with dashed lines in FIG. 5.

At optional box 3001, the UE transmits an UL control message to the cellular network. The UL control message is associated with a DM-RS transmission.

The DM-RSs are for estimating the radio channel between the UE and the cellular network. Based on such channel estimation, a BS of the cellular network can coherently decode signals received from the UE. The DM-RSs can be associated with a data transmission—e.g., payload data and/or control data, e.g., on the PUSCH or PUCCH—i.e., be interspersed with RE allocated to the data transmission and/or using the same precoding as used for transmitting of data signals including data of the data transmission.

The UL control message implements a request for a DM-RS configuration, e.g., for an adjustment or change thereof. For example, an adjustment that would allow increased repetition, etc. For instance, the UL control message could request an adjustment of one or more UL DM-RS properties.

For instance, the one or more UL DM-RS properties may be selected from the group comprising: frequency density of the DM-RSs; time density of the DM-RSs; frequency hopping pattern; parameter of a time-frequency resource mapping of REs allocated to the DM-RSs; frequency-domain spacing between DM-RSs allocated to REs that are adjacent in frequency domain; time-domain spacing between DM-RSs allocated to the REs that are adjacent time domain; count of DM-RSs per RB; polarization used for UL DM-RS; suspending the UL DM-RS transmission; etc.

It would be possible that the UE determines the requested DM-RS configuration. One or more decision criteria can be taken into account, e.g., summarised above in TAB. 3.

In other examples, it is possible that the configuration is determined at the cellular network. A re-configuration can be triggered at the cellular network. At least in such scenarios it is not required to execute box 3001.

Next, at box 3002, a DL control message is received from the communications network. The DL control message is indicative of a UL DM-RS configuration. For instance, the DL control message could be indicative of an adjustment of one or more UL DM-RS properties (e.g., as explained in connection with box 3001 above). One or more respective settings of a configuration of the DM-RS may be indicated, e.g., by one or more respective indicators.

Then, at box 3003, the DM-RSs are transmitted in accordance with the configuration as indicated by the DL control message received at box 3002. For instance, considering a scenario in which the DL control message received at box 3002 is indicative of a frequency density of the UL DM-RSs, it is then possible that the UL RSs are transmitted, at box 3003, on the radio channel using a time-frequency resource mapping that is set in accordance with the frequency density.

As illustrated in FIG. 5, executing box 3003 can be correlated with executing box 3030. Thus, along with commencing said transmitting of the UL RSs at box 3003, at box 3030 there is a switch between different settings of a CE parameter of the UL data transmission that is associated with the DM-RS. Example CE parameters have been summarized above in TAB. 2.

Such correlated execution of box 3003 along with box 3030 can mean that, e.g., box 3003 is executed upon detecting the switch of the setting of the CE parameter at box 3030, or vice versa that the CE parameter at box 3030 is switched upon commencing to transmit the UL RSs at box 3003 using the configuration of box 3002. Such correlated execution could also mean that the UE receives respective commands from the cellular network, to contemporaneously or at least time aligned execute box 3003 at box 3030. The correlated execution could also mean that the setting of the CE parameter at box 3030 is determined based on the configuration of the DM-RS received at box 3002 used for transmitting at box 3030. For instance, a predefined correlation may be used by the UE to determine the new setting of the CE parameter, based on the configuration of the DM-RS, e.g., the frequency density. The correlation "translates" the configuration of the DM-RS into the setting of the CE parameter. An example implementation of the correlation as mapping table is illustrated below in TAB 5:

TABLE 5

Example implementation of the correlation between CE parameter (here: repetition count of redundancy version retransmissions) and configuration of DM-RS transmission (here: frequency density).

| Entry | Setting repetition count | Frequency density |
| --- | --- | --- |
| A | Low | High |
| B | Medium | Medium |
| C | High | Low |

By using such correlated execution of box 3003 along with box 3030, the CE for the data transmission can be facilitated by the (re-)configuration of the DM-RS transmission.

At box 3004, it is checked whether a DM-RS-free operation should commence. If this is the case, then, at box 3005, transmitting the DM-RSs is suspended.

For example, it would be possible to check, at box 3004, whether a predefined CE transmission mode for the UL data transmission associated with the DM-RSs is activated. In the affirmative, box 3005 may be executed. This is labeled DM-RS-free operation.

For illustration, the predefined CE transmission mode may be characterized by a code rate of the data of the data transmission associated with the DM-RSs that is below a predefined threshold. Typically, the predefined threshold could be 1/100 or even smaller. Alternatively or additionally, the CE transmission mode could be characterized by repetitions of a given redundancy version of the data. More specifically, it would be possible that the CE transmission mode is characterized by a redundancy repetition count being above a predefined threshold. Typically, the predefined threshold could be 1000 or even 5000 or larger.

The CE transmission mode may be characterized by other criteria defined in connection with CE parameters as summarized in TAB. 2.

Once it is judged, at box 3006, that the DM-RS-free operation is to be stopped, then transmission of DM-RSs can be restarted, at a further iteration of box 3003.

For instance, at box 3006, it may be checked whether a predetermined amount of time since executing 3004 has expired, e.g., based on a timer initialized when executing 3004. The amount of time may be measured in subframes or frames, e.g., after at least ten subframes etc.

At box 3006 one or more further criteria may be checked, e.g., reception of a DL control message from the cellular NW, or whether the predefined CE transmission mode—discussed in connection with box 3004—has ended.

Accordingly, as will be appreciated from the above, the method of FIG. 5 facilitates a dynamic adjustment of the properties of UL DM-RSs, in particular, of the frequency density of the UL DM-RSs. Details with respect to such dynamic adjustment are illustrated in connection with FIG. 6.

Figure 6:
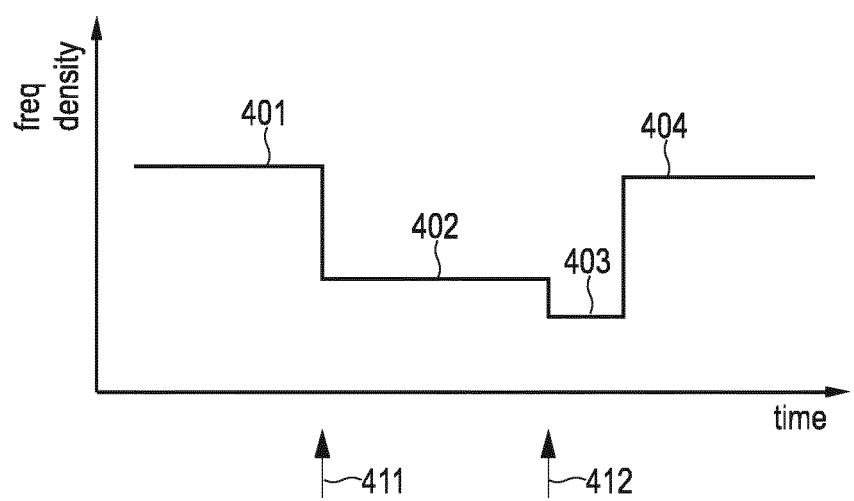
FIG. 6 schematically illustrates dynamically adjusting a frequency density of reference signals according to various examples.

FIG. 6 schematically illustrates a temporal evolution of the frequency density 401-404 of the DM-RSs. As illustrated, from time to time, different frequency density is 401-404 are implemented. For instance, the adjustment from the frequency density 401 to the lower frequency density 402 is triggered by a DL control message 411 received at the UE 101. Likewise, the adjustment from the frequency density 402 to the frequency density 403 is triggered by a further DL control message 412. For instance, the further DL control message 412 could be indicative of an incremental or relative change, i.e., a difference between the frequency density 402 and the frequency density 403. Differently, the DL control message 411 could be indicative of an entry of a predefined codebook specifying the frequency density 402. These are just examples.

As a general rule, it is not required that all adjustment of the frequency density 401-402 are immediately in response to reception of a respective DL control message 411-412 (albeit this is a possibility). For instance, it would be possible that a respective timer is defined and initialized upon reception of the DL control message 412 and, upon expiry of that time, the adjustment from the frequency density 403 to the frequency density 404 is triggered. Other trigger criterion for executing the adjustment of the frequency density are conceivable, such as changes of the channel quality of the radio channel 114; i.e., once the channel quality fulfils a predefined criterion, the previously configured adjustment can be executed.

As a general rule, the downlink control message may parameterize one or more trigger criteria to execute the (re-)configuration of the UL DM-RS transmission and then the UE can monitor whether the one or more trigger criteria are fulfilled (e.g., SINR, SNR, path loss, fading, coherence bandwidth, or generally any trigger criterion specified in TAB. 3).

Above, aspects with respect to dynamically adjusting the frequency density of the RSs have been explained. Next, details with respect to implementing different frequency densities of the RSs are discussed in connection with FIG. 7.

Figure 7:
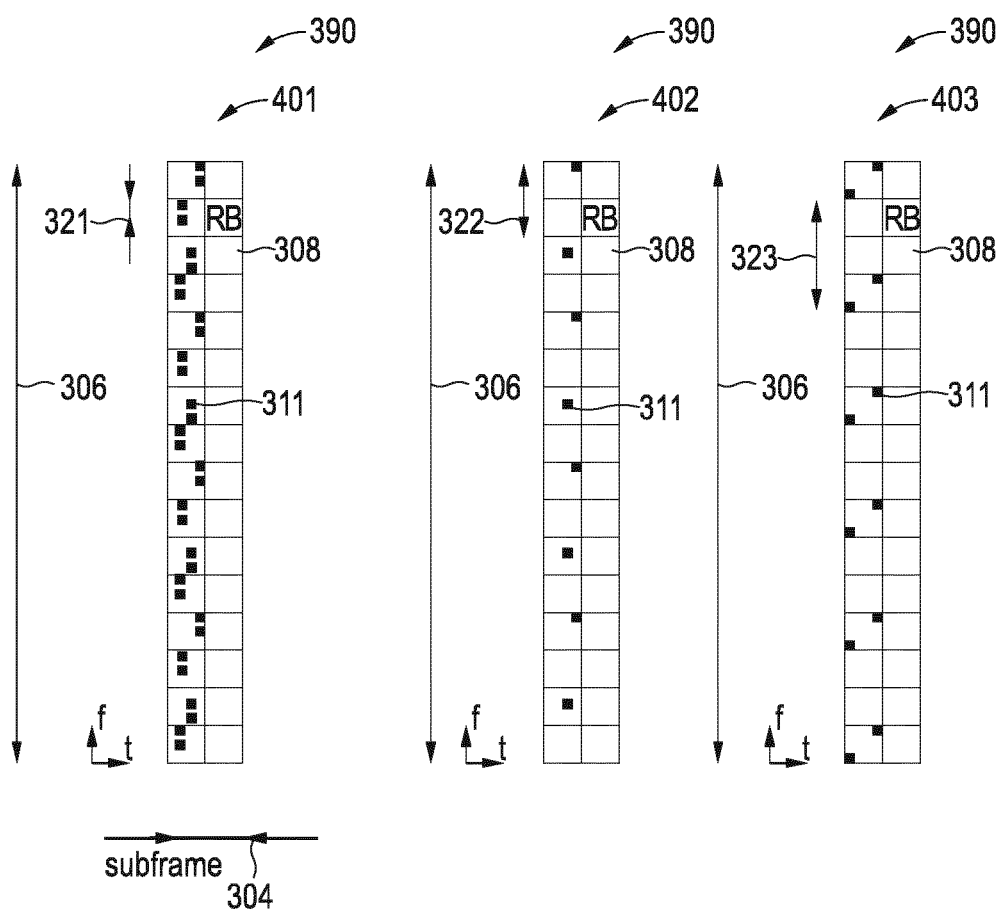
FIG. 7 schematically illustrates different frequency densities of reference signals implemented by different time-frequency resource mappings of resources allocated to the reference signals according to various examples.

FIG. 7 schematically illustrates aspects with respect to the allocation of REs 311 (selected from all available REs 309 of the time-frequency resource grid 300) to RSs (DM-RS REs 311). I.e., FIG. 7 illustrates a time-frequency resource mapping 390 of the DM-REs 311 to the resource grid 300, for multiple RBs 308. The time-frequency resource mapping 390—in the illustrated example—is defined for a subframe 304 and can be repeated from subframe. A front-loaded scenario is shown in which the DM-RS REs 311 are all in the first slot 303 of the subframe 304. Another option would be back-loaded DM-RSs, or DM-RSs located in symbols interior with respect to an associated data allocation.

"Front-loaded" can means that RSs are transmitted before the data transmissions they assist. That in, in the first (and possibly) second symbols of the slot or UL data allocation, depending on the pilot type. Additional pilots might also be present in later symbols.

Other REs not allocated to the DM-RSs can be allocated to the data transmission. For instance, all remaining REs in the subframes 304 could be allocated to the data transmission, or at least 80% or at least 50%. There may be some RE allocated to other RSs, etc. It would also be possible that RBs 308 including at least one DM-RS REs 311 do not include any other signals, e.g., for DFT-spread OFDM uplink.

As a general rule, the allocation can be with respect to a reference subcarrier acting as baseline. The reference subcarrier could be network-configured. This would provide for an absolute allocation of the DM-RS REs 311. RBAs illustrated in FIG. 7, the DM-RS REs 311 are essentially spread across the entire frequency range 306 of the data transmission.

In FIG. 7, different frequency spacings 321-323 (e.g., see parameter $\Delta_F$ discussed above) are illustrated for the different frequency densities 401-403. As illustrated in FIG. 7, for a lower frequency density 401-403, the frequency spacing 321-323 increases.

As a general rule—and as illustrated in FIG. 7—the frequency spacings can be approximately constant across the entire frequency range 306. E.g., a variation may be less than 80% or less than 20%.

In FIG. 7, the frequency density 401 is two per RB 308 and the frequency density 402 is 0.5 per RB 308 and the frequency density 403 is two-thirds per RB 308 (not counting RBs 308 of the second slot of the subframe 304 that are generally not used for the DM-RS transmission). These are just examples.

For the time-frequency resource mappings 390 implementing the frequency density 402 the frequency density 403, some RBs 308 include no REs 309 allocated to the DM-RSs while other RBs 308 include one or two REs 311 (again, only considering those slots that carry any DM-RSs)—i.e., different RBs 308 of the first slot include different counts of DM-RSs.

Figure 8:
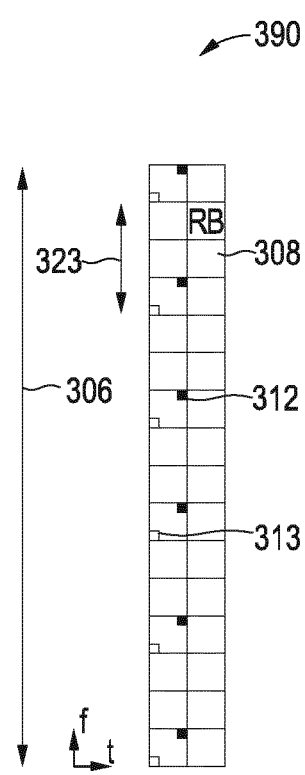
FIG. 8 schematically illustrates allocating resources to reference signals that are orthogonally polarized according to various examples.

FIG. 8 schematically illustrates aspects with respect to the allocation of REs 312, 313 (selected from all available REs 309 of the time-frequency resource grid 300) to RSs (DM-RS REs 312, 313).

In the illustrated example, the DM-RS REs 312 are allocated to the DM-RSs having a 0° polarization and the DM-RS REs 313 are allocated to the DM-RSs having a 90° polarization (relatively defined with respect to each other, i.e., orthogonal). As will be appreciated, the frequency domain density for both subgroups of demodulation reference signals, i.e., 0° and 90° polarization is the same, i.e., one-third per RB 308. This is just an example. As a general rule, the frequency domain density may differ for the two subgroups, e.g., to track a dominant polarization of the radio channel 114. As a general rule, the frequency densities for the two subgroups can be separately configured (cf. FIG. 5, box 3002). In general, the polarizations do not need to be at exactly 90° and 0° in an absolute direction. It can be appreciated that any two independent polarization, such as any two orthogonal polarizations, will serve equally well.

Figure 9:
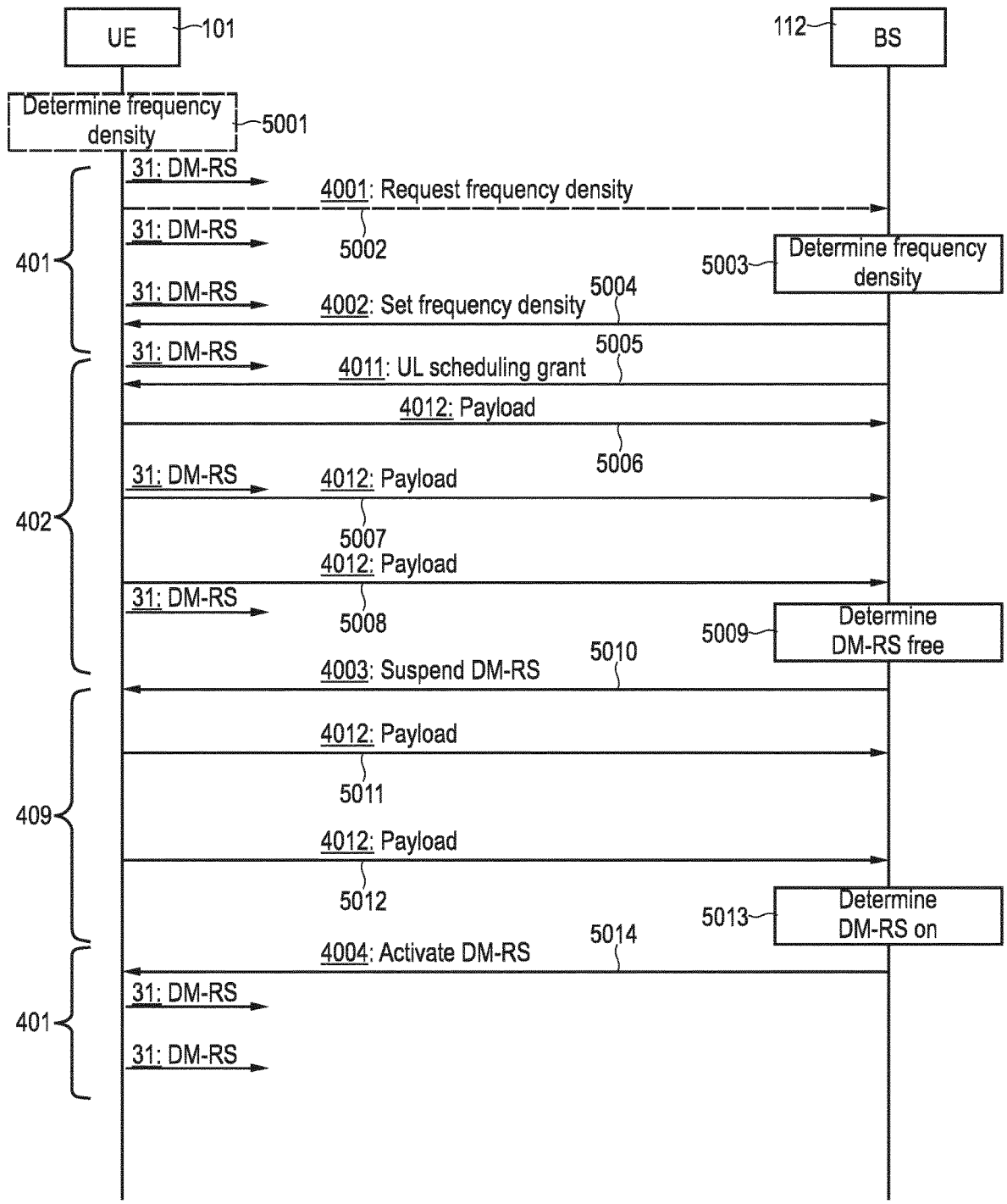
FIG. 9 is a signaling diagram according to various examples.

FIG. 9 is a signaling diagram of communication between the UE 101 and the BS 112.

At optional box 5001, the UE 101 determines a requested frequency density for DM-RSs 31 repeatedly transmitted by the UE 101 to the BS 112 (for sake of legibility, the arrows indicating the DM-RSs 31 are not connected all the way through to the BS 112 and FIG. 9; but the BS 112 attempts to receives these DM-RSs 31).

Such determination could be based on at least one of a coherence bandwidth of the radio channel 114, a receive quality of signals received on the radio channel 114, or a CE parameter used for the UL data transmission (see TAB. 2).

Then, optionally, at 5002, an UL control message 4001 as transmitted to the BS 112. The UL control message 4001 is indicative of the requested frequency density of the DM-RSs 31.

Thus, box 5001 and 5002 correspond to box 3001 of FIG. 5.

The BS 112, at box 5003, determines the frequency density to be used for the DM-RSs 31. This could be based on at least one of the coherence bandwidth of the radio channel 114, a receive quality of signals transmitted on the radio channel 114, a CE parameter used for the UL data transmission (cf. TAB. 2) or—where applicable—the UL control message 4001.

It would be possible that the BS 112, at box 5003, also determines a setting of a CE parameter (cf. TAB. 2) to switched to for the payload data transmission 4012 when using the newly-determined frequency density. It would be possible that the frequency density is determined based on the determined setting, or vice versa.

The BS 112, at 5004, transmits a DL control message 4002 that is indicative of the frequency density of the DM-RSs 31 determined at box 5003. Thus, the DL control message 4002 could implement one of the DL control messages 411, 412 discussed above.

For illustration, the DL control message 4002 could be a L2 or L1 control message. This would facilitate a fast adjustment of the frequency density, without requiring a complete reconfiguration—e.g., on L3—of the DM-RS transmission.

As a general rule, a DL control message 4002 could be transmitted multiple times within a frame, e.g., once per subframe. Thereby, it would be possible to dynamically adjust the frequency spacing on a short timescale, flexibly tracking the condition of the radio channel 114. There could be a fixed resource allocation available, e.g., on PDCCH, to adjust the frequency spacing (or another configuration parameter of the DM-RS transmission).

5004 thus corresponds to box 3002 of FIG. 5.

The DL control message 4002—or another DL control message (not shown in FIG. 9)—could also be indicative of any determining setting of the CE parameter.

As illustrated in FIG. 9, upon receiving the DL control message 4001, the frequency density 402 is implemented, following the frequency density 401 (cf. box 3003 of FIG. 5).

At 5005, the BS 112 transmits an UL scheduling grant 4011 to the UE 101. The UL scheduling grant is indicative of a set of REs 309 of the time-frequency resource grid 300, e.g., by indicating one or more RBs 308. The UE 101 could then select time frequency REs 311-313 allocated to the DM-RSs 31 and further time-frequency REs allocated to payload signal encoding payload data of the payload data transmission 4012, executed at 5006, 5007, and 5008, from the indicated set. This selection can be in accordance with the time-frequency resource mapping 390 that is set in accordance with the frequency density as indicated by the DL control message 4002.

The payload data transmission 4012 can be in accordance with the setting of the CE parameter, newly-determined in some examples at 5003, as described above (cf. box 3030 of FIG. 5).

At 5009, the BS 112 determines that DM-RS-free operation shall commence and a respective control message 4003 is transmitted by the BS 112 at 5010, to inform the UE 101 (cf. FIG. 5, box 3004). Accordingly, a zero frequency density 409 is activated and DM-RSs 31 are not transmitted (i.e., $\Delta_F = \infty$). The data signals encoding the payload data 4012 transmitted at 5011 and 5012 are blind decoded by the BS 112.

The DM-RS-free operation is determined to stop at box 5013 (cf. FIG. 5, box 3006) and upon transmitting a respective DL control message 4004 to activate the DM-RSs, DM-RSs 31 are transmitted again.

Figure 10:
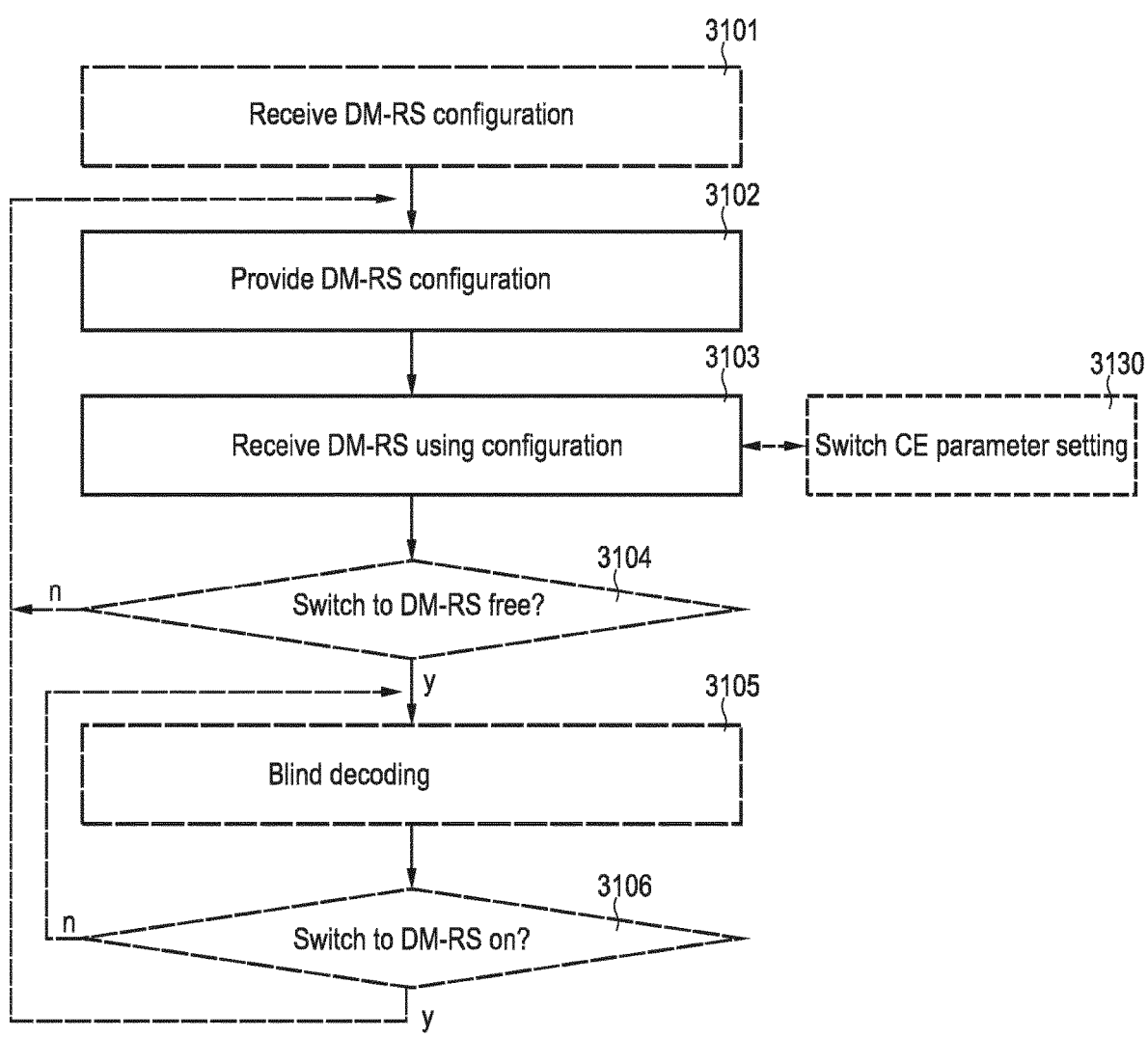
FIG. 10 is a flowchart of a method according to various examples.

FIG. 10 is a flowchart of a method according to various examples. For instance, the method of FIG. 10 could be executed by a BS. For instance, the method of FIG. 10 could be implemented by the control circuitry 1122 of the BS 112 of the cellular network 100.

Optional boxes are illustrated using dashed lines in FIG. 10.

At optional box 3101, and UL control message indicative of a requested adjustment of a configuration used for transmitting DM-RSs is received from a UE. Box 3101 corresponds to box 3001.

At box 3102, a configuration for DM-RSs is determined and, subsequently, provided to the UE, using one or more control messages transmitted in the DL. Box 3102 corresponds to box 3002.

Then, at box 3103, DM-RSs are received in accordance with the configuration is provided at box 3102. Box 3103 can be correlated to box 3130 where a setting of a CE parameter is switched. Respective details have been explained above in connection with box 3003 and 3030.

At box 3104 it is checked whether transmission of DM-RSs is to be suspended, as explained above in connection with box 3004. In the affirmative, at box 3105, the BS blindly decodes data signals including data of a data transmission, because there are no DM-RSs transmitted by the UE.

The decision at box 3104 could be based on activation of a CE transmission mode used for the data transmission, as explained above in connection with box 3004.

Then, at box 3106, it can be judged to switch on the transmission of DM-RSs again.

Next, details with respect to adjusting a frequency density of the RSs will be explained in connection with FIG. 11 and FIG. 12.

FIG. 11 schematically illustrates aspects with respect to changing the frequency density of the RSs by changing the frequency spacing between adjacent RSs 31. FIG. 11 is a histogram illustrating the various frequency spacings of the RSs 31 across the frequency range 306. As illustrated in FIG. 11 by the full bar, there is only a single—comparably small—frequency spacing 371 (here, the size of the frequency spacing 371 is the size of a RB 308) encountered, meaning that all RSs 31 are evenly distributed across the frequency range 306. There are no clusters of RSs 31 in frequency domain having a smaller frequency spacing. It can be said that the spectrum frequency spacings only has a single contribution. This histogram of frequency spacings defines a pattern of the time-frequency resource mapping 390, as illustrated in the bottom part of FIG. 11.

The adjustment of the frequency density is obtained by evenly scaling the frequency spacing 371 across the frequency range 306, to the frequency spacing 372. The pattern of the time-frequency resource mapping 390 is preserved, since no new contributions are added to the frequency spectrum, all that is observed is a shift of the only, single contribution.

Thus, as a general rule, in adjustment of the frequency density can be achieved by changing the one or more frequency spacings between adjacent RSs 31, without changing the count of frequency spacings across the frequency range 306. The pattern of the time-frequency resource mapping 390 can remain unaffected by the adjustment of the frequency density. This makes an adjustment simple and thus allows to reduce the complexity of the adjustment; in turn, the adjustment can be carried out quickly, e.g., multiple times within a frame. This enables to track the radio channel 114 accurately.

A different scenario is illustrated in FIG. 12. Here, the count of frequency spacings is changed by introducing a new contribution to the spectrum of frequency spacings, by forming clusters of closely-packed RSs having the spacing 374. The pattern of the time-frequency resource mapping 390 is changed by the adjustment. Also, the average frequency density is reduced (from 1 per RB 308 to 0.5 per RB 308).

For instance, 3GPP NR type 1 and type 2 DM-RS are characterized by a change in the pattern of the time-frequency resource mapping 390. See Dahlman, Erik, Stefan Parkvall, and Johan Skold. 5G NR: The next generation wireless access technology. Academic Press, 2018; FIG. 9.18 vs. FIG. 9.19. For type 1, a new cluster of RSs is introduced. A switching between DM-RS type 1 and type 2 is comparably complex and slow (typically requiring RRC re-configuration) and thus limited in its suitability to track changes on the radio channel and adjusting the frequency density or another parameter of the DM-RS transmission along with changes to the setting of a CE parameter, as explained above.

As a general rule, a change of one or more configuration parameters of the RSs transmission could be implemented by specifying a new type, e.g., type 3 DM-RS. It would also be possible to specify changes with respect type 1 or type 2 DM-RS of 3GPP NR.

Summarizing, at least the following examples have been described above:

Example 1: A method to control a density of RSs used for demodulation of associated payload data transmissions, in the UL and/or in the DL, including: A signaling, from the UE to BS, (optionally) requesting a desired density of pilot signals; and a signaling, from the BS to the UE, configuring the density (in frequency domain) of RSs.

Example 2: The method according to Example 1, wherein the said density depends on one more of the following factors: (in spec this is implementation, i.e. transparent)
  a. A coherence bandwidth of the radio channel (could be zero, i.e., o need for DMRS) as estimated by the UE and/or the BS, in the DL and/or in the UL;
  b. A signal-to-noise ratio (SNR) or a signal-to-interference-plus-noise ratio (SINR) as estimated by the BS or the UE, in the DL and/or in the UL;
  c. A desired or actual coding rate of the associated payload data transmissions, in the DL and/or in the UL.

Example 3: The method according to any one of the preceding Examples, wherein the RSs are divided into two groups, each using a different transmit polarization, so that the associated data transmission can track the polarization of the radio channel.

Example 3 may be implemented in one of the following ways:
  a. By using a feedback signaling indicating an observed polarization of the transmitted RSs. In an example (Note that, typically, the following steps i. and v. are executed concurrently):
    i. the UE transmits PUSCH DM-RS to the BS,
    ii. the BS estimates a polarization of the received PUSCH DM-RS (per relevant bandwidth, which depend on the DMRS density in frequency domain),
    iii. the BS signals the estimated optimal polarization direction to UE,
    iv. the UE aligns subsequent PUSCH data transmissions according to the polarization feedback by the BS,
    v. the UE transmits more PUSCH DM-RS to the BS, and so on.
  b. By sending RSs in the reverse direction if compared to scenario a above. For example, suitable designed PDSCH DM-RS (or CSI-RS) can be used by the UE to estimate a suitable polarization for PUSCH transmissions and associated PUSH DM-RS transmissions. In this case, no feedback channel is required.

Example 4: Ultra-low coding rates for reliable data transmissions of payload data and/or control data, e.g., Layer 3 RRC control data. For example, coding rates lower than $\frac{1}{100}$ might be signaled to UEs located at the cell edge. Transmissions with ultra-low coding rates may span multiple slots.

Example 5: Blind decoding of payload data transmissions, i.e., without associated RSs. For example, blind decoding might be signaled for data transmissions of payload data and/or control data with ultra-low coding rates. (DMRS less)

Example 6: Repetitions, in the frequency domain, of payload data transmissions, using the same or different redundancy versions. Associated RSs can be transmitted in all, some or none of the repetitions.

Further, at least the following EXAMPLES have been described above.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For illustration, above, various scenarios have been discussed in the context of UL RSs transmitted from the UE to the communications network. Similar techniques may be readily applied for DL RSs. For example, a frequency density of DL RSs may be signalled to the UE and the UE may then monitor for the DL RSs using a time-frequency resource mapping set in accordance with the frequency mapping.

For further illustration, various scenarios have been discussed in the context of a scenario in which the logic for determining the frequency density (or another configuration of a transmission of RSs) resides at the network. In other scenarios, it would be possible that such logic resides at the UE.

For further illustration, various examples have been described in connection with DM-RSs, but similar techniques may be implemented with other kinds and types of RSs.

For still further illustration, while various examples happen described in which a frequency density of reference signals is adjusted, in other scenarios, other configuration parameters of the configuration of a reference signal transmission can be adjusted, e.g., a frequency spacing (keeping the average frequency density constant), used polarizations, and so forth.

The invention claimed is:

1. A method of operating a wireless communication device, the method comprising:
   receiving at least one downlink control message from a communications network, the at least one downlink control message being indicative of a frequency density of uplink reference signals, the uplink reference signals being for an estimation of a radio channel between the wireless communication device and the communications network to coherently decode data signals encoding data of a uplink data transmission, the uplink reference signals and the data signals using the same precoding,
   transmitting the uplink reference signals on the radio channel using a time-frequency resource mapping set in accordance with the frequency density, the time-frequency resource mapping allocating time-frequency resource elements of a plurality of time-frequency resource elements of a time-frequency resource grid of the radio channel to the uplink reference signals, and
   suspending said transmitting of the uplink reference signals upon activating a predefined coverage enhancement transmission mode for the uplink data transmission, wherein the predefined coverage enhancement transmission mode is characterized by a code rate of the data below a predefined threshold.

2. The method of claim 1,
   wherein further time-frequency resource elements of the plurality of time-frequency resource elements of the time-frequency resource grid are allocated to the data signals using a scheduling control message comprising an indicator indicative of one or more resource blocks, each resource block comprising multiple time-frequency resource elements of the time-frequency resource grid, the time-frequency resource elements allocated to the uplink reference signals being different from the further time-frequency resource elements,
   wherein the frequency density is not larger than one per resource block.

3. The method of claim 1,
   wherein further time-frequency resource elements of the plurality of time-frequency resource elements of the time-frequency resource grid are allocated to the data signals using a scheduling control message comprising an indicator indicative of one or more resource blocks, each resource block comprising multiple time-frequency resource elements of the time-frequency resource grid,
   wherein the time-frequency resource mapping allocates, for adjacent resource blocks, different counts of the time-frequency resource elements to the uplink reference signals.

4. The method of claim 1, further comprising:
   along with commencing said transmitting of the uplink reference signals in accordance with the time-frequency resource mapping set in accordance with the frequency density, switching from a first setting of a coverage enhancement parameter used for the uplink data transmission to a second setting of the coverage enhancement parameter used for the uplink data transmission.

5. The method of claim 4,
   wherein the coverage enhancement parameter comprises a transmit power of the data signals.

6. The method of claim 4,
   wherein the coverage enhancement parameter comprises at least one of a redundancy repetition count of the data of the uplink data transmission in time domain and/or frequency domain, or a code rate of the data of the uplink data transmission,
   wherein optionally the second setting of the code rate is below $\frac{1}{100}$,
   wherein optionally a length of a given redundancy version of the data of the uplink data transmission transmitted using the second setting of the code rate is longer than at least two slots.

7. The method of claim 4,
   wherein the second setting is determined based on a predefined correlation between multiple frequency densities and multiple settings of the coverage enhancement parameter, or
   wherein the at least one downlink control message is indicative of the second setting of the coverage enhancement parameter used for the uplink data transmission.

8. The method of claim 1, further comprising:
   wherein further time-frequency resource elements of the plurality of time-frequency resource elements of the time-frequency resource grid are allocated to the data signals,
   wherein the method further comprises:
   receiving, from the communications network, a scheduling control message indicative of a set of time-frequency resource elements, and
   selecting the time-frequency resource elements and the further time-frequency resource elements from the set of time-frequency resource elements.

9. The method of claim 1, further comprising:
   transmitting at least one uplink control message to the communications network, the at least one uplink control message being indicative of a requested frequency density of the uplink reference signals.

10. The method of claim 9, further comprising:
    determining the requested frequency density based on at least one of a coherence bandwidth of the radio channel, a receive quality of uplink and/or downlink signals transmitted on the radio channel, or a coverage enhancement parameter used for the uplink data transmission.

11. The method of claim 1,
    wherein the uplink reference signals comprise first uplink reference signals having a first polarization and second uplink reference signals having a second polarization, the first polarization and the second polarization being orthogonal,
    wherein the at least one downlink control message is indicative of at least one of a first frequency density of the first uplink reference signals or a second frequency density of the second uplink reference signals.

12. The method of claim 1,
    wherein at least one of the at least one downlink control message is indicative of a relative change of the frequency density of the uplink reference signals.

13. The method of claim 1,
    wherein at least one of the at least one downlink control message is indicative of the frequency density by selection from a predefined codebook, the predefined codebook comprising at least three entries.

14. The method of claim 1,
wherein optionally the predefined threshold is $1/100$,
wherein optionally a length of a given redundancy version of the data of the uplink data transmission transmitted using the second setting of the code rate is longer than at least two slots.

15. The method of claim 1,
wherein the predefined coverage enhancement transmission mode is characterized by a count of repetitions of a given redundancy version of the data exceeding a predefined threshold, the repetitions of the given redundancy versions being in time domain and/or frequency domain.

16. The method of claim 1, further comprising switching from a first setting of a coverage enhancement parameter used for the uplink data transmission to a second setting of the coverage enhancement parameter used for the uplink data transmission, wherein the coverage enhancement parameter comprises at least one of a redundancy repetition count of the data of the uplink data transmission in time domain and/or frequency domain, or a code rate of the data of the uplink data transmission.

17. A method of operating an access node of a communications network, the method comprising:

transmitting at least one downlink control message to a wireless communication device, the at least one downlink control message being indicative of a frequency density of uplink reference signals, the uplink reference signals being for an estimation of a radio channel between the wireless communication device and the communications network to coherently decode data signals encoding data of uplink data transmission, the uplink reference signals and the data signals using the same precoding, receiving the uplink reference signals on the radio channel using a time-frequency resource mapping set in accordance with the frequency density, the time-frequency resource mapping allocating time-frequency resource elements of a plurality of time-frequency resource elements of a time-frequency resource grid of the radio channel to the uplink reference signals, and determining a setting of a coverage enhancement parameter used for the uplink data transmission in a correlated manner with said determined of the frequency density, wherein the coverage enhancement parameter comprises at least one of a redundancy repetition count of the data of an uplink data transmission in time domain and/or frequency domain, or a code rate of the data of the uplink data transmission.

18. The method of claim 17, further comprising:

determining the frequency density based on at least one of a coherence bandwidth of the radio channel, a receive quality of uplink signals and/or downlink signals transmitted on the radio channel, a coverage enhancement parameter used for the uplink data transmission, or an uplink control message received from the wireless communication device, the at least one uplink control message being indicative of a requested frequency density of the uplink reference signals.

19. A wireless communication device comprising a control circuitry configured to:

receive at least one downlink control message from a communications network, the at least one downlink control message being indicative of a frequency density of uplink reference signals, the uplink reference signals being for an estimation of a radio channel between the wireless communication device and the communications network to coherently decode data signals encoding data of a uplink data transmission, the uplink reference signals and the data signals using the same precoding, transmit the uplink reference signals on the radio channel using a time-frequency resource mapping set in accordance with the frequency density, the time-frequency resource mapping allocating time-frequency resource elements of a plurality of time-frequency resource elements of a time-frequency resource grid of the radio channel to the uplink reference signals, and suspend said transmitting of the uplink reference signals upon activating a predefined coverage enhancement transmission mode for the uplink data transmission, wherein the predefined coverage enhancement transmission mode is characterized by a code rate of the data below a predefined threshold.

* * * * *